May 23, 1939.  K. HARTLEY  2,159,082
APPARATUS FOR MAKING GRAVITY MEASUREMENTS
Filed March 31, 1934   5 Sheets-Sheet 1

WITNESS:

INVENTOR
Kenneth Hartley
BY
ATTORNEYS.

May 23, 1939.  K. HARTLEY  2,159,082
APPARATUS FOR MAKING GRAVITY MEASUREMENTS
Filed March 31, 1934   5 Sheets-Sheet 2

INVENTOR
Kenneth Hartley
BY
Busser & Harding
ATTORNEYS.

May 23, 1939.  K. HARTLEY  2,159,082
APPARATUS FOR MAKING GRAVITY MEASUREMENTS
Filed March 31, 1934   5 Sheets-Sheet 3

INVENTOR
Kenneth Hartley
BY
ATTORNEYS.

WITNESS:

May 23, 1939.    K. HARTLEY    2,159,082
APPARATUS FOR MAKING GRAVITY MEASUREMENTS
Filed March 31, 1934    5 Sheets-Sheet 4

INVENTOR
Kenneth Hartley
BY
Bauser & Harding
ATTORNEYS.

May 23, 1939. K. HARTLEY 2,159,082
APPARATUS FOR MAKING GRAVITY MEASUREMENTS
Filed March 31, 1934 5 Sheets-Sheet 5
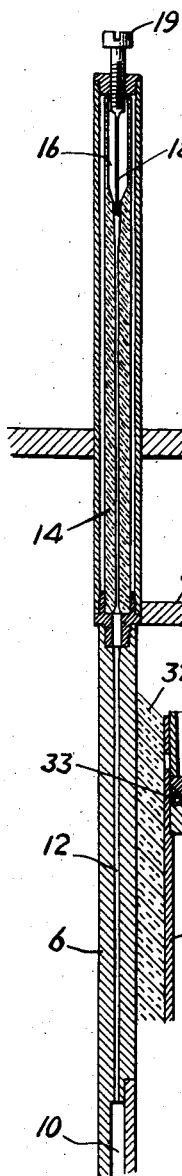
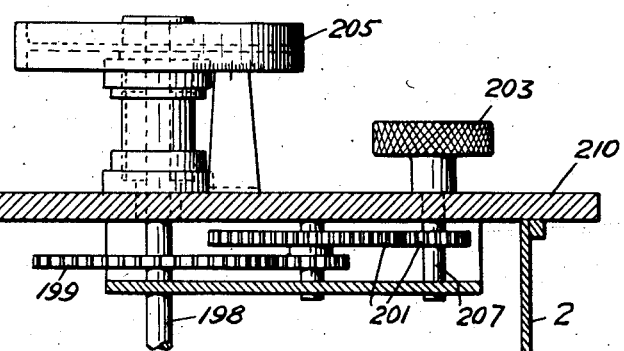
FIG. 16.
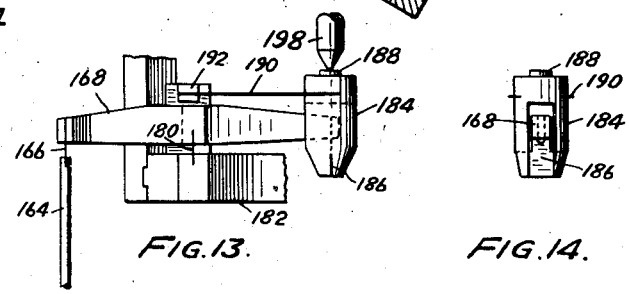
FIG. 13. FIG. 14.
INVENTOR
Kenneth Hartley
BY
ATTORNEYS.
WITNESS:

Patented May 23, 1939

2,159,082

UNITED STATES PATENT OFFICE 2,159,082

APPARATUS FOR MAKING GRAVITY MEASUREMENTS

Kenneth Hartley, Houston, Tex., assignor, by mesne assignments, to Humble Oil & Refining Company, Harris County, Tex., a corporation of Texas Application March 31, 1934, Serial No. 718,453

9 Claims. (Cl. 265—1.4)

This invention relates to an apparatus whereby measurements of changes of the force of gravity may be made to a very high degree of accuracy. The instrument in accordance with the following disclosure is capable of making measurements with a precision of one ten-thousandth of a dyne per gram, or approximately one ten-millionth of the total force of gravity.

The apparatus is of the same general character as that described in my Patent 1,898,534, dated Feb. 21, 1933.

It is now well known that the variations of gravitational force are closely connected with the variations of geological structure adjacent the surface of the earth. This fact has been used in geophysical exploration for the location of mineral and oil deposits, the latter being effected by locating salt domes which are generally associated with oil deposits.

It is the object of the present invention to provide a process and apparatus whereby such geophysical exploration may be carried out in a rapid and accurate fashion. Heretofore measurements of variations of the force of gravity have taken very substantial periods of time because of the necessity, for example, of measuring over a long period the vibrations of a pendulum or torsion balance. In accordance with the present invention it is only necessary to attain an equilibrium following an accurate leveling of an instrument whereupon the variations of the force of gravity may be read almost directly.

Various objects of the invention relating primarily to details of construction and operation whereby great accuracy and ready making of observations without loss of time may be effected will be apparent from the following description read in conjunction with the accompanying drawings, in which.

Figure 17:
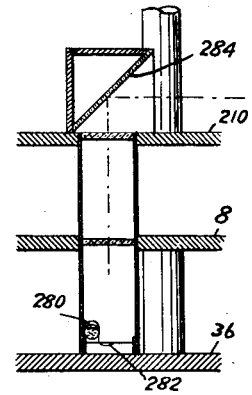
Figure 18:
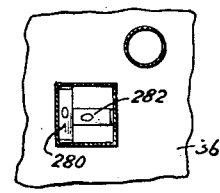
Figures 2, 3, 4, 5:
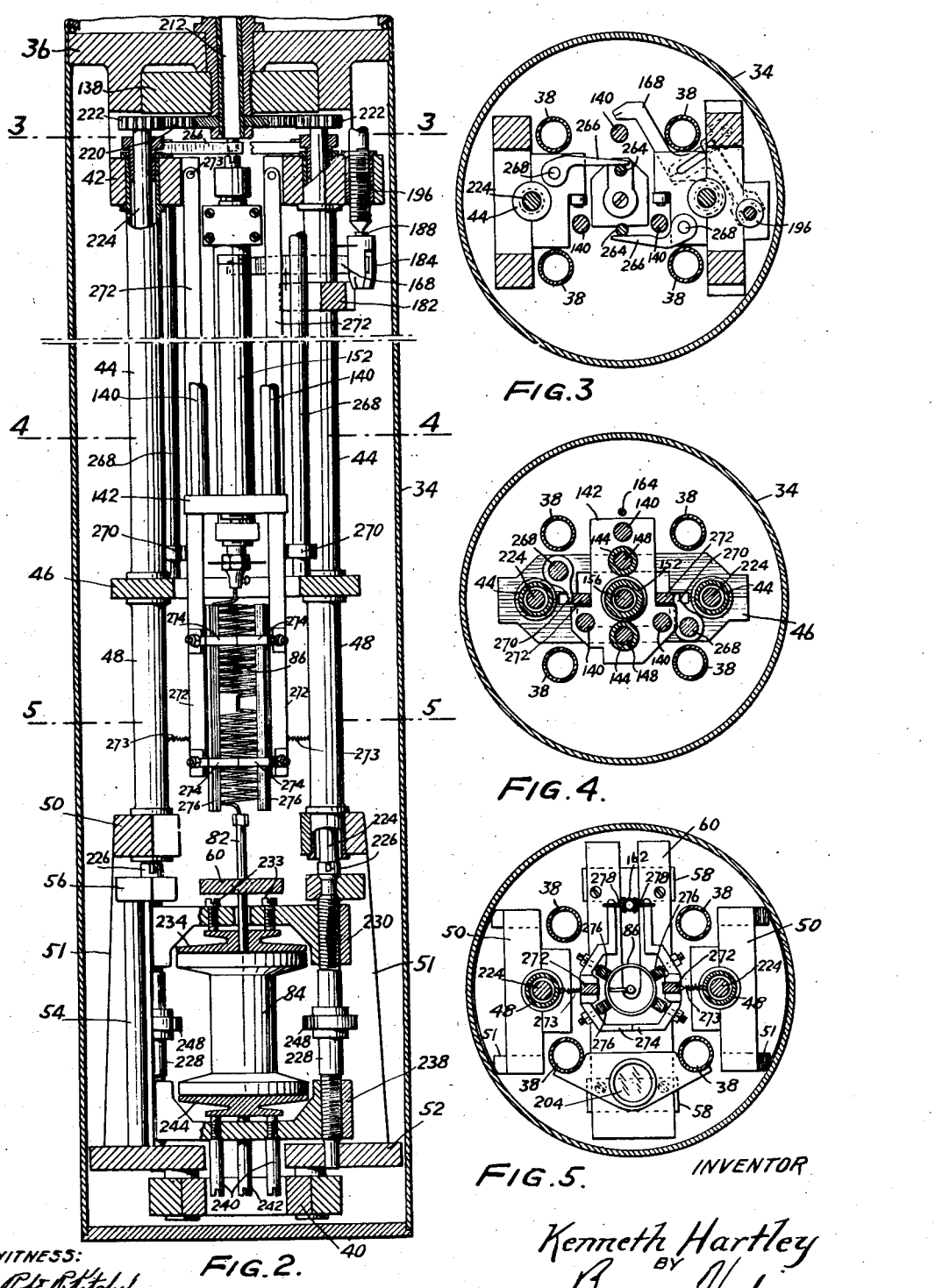
Fig. 2 is a vertical section showing the principal operating parts of the apparatus in detail.
Figure 6:
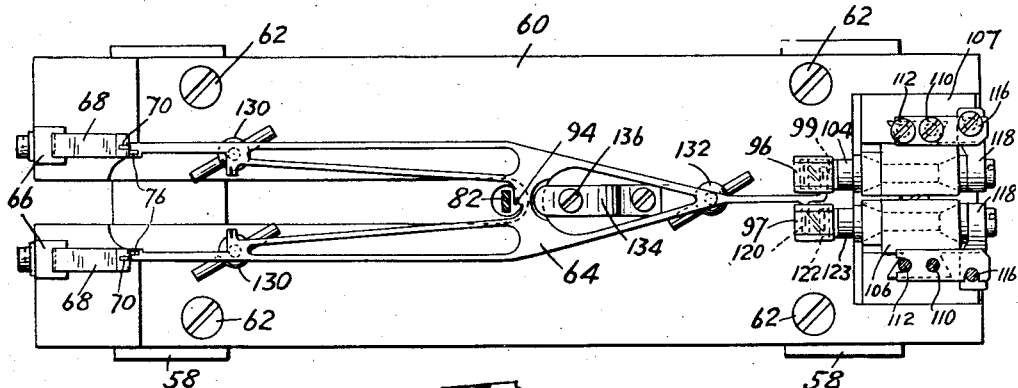
Figure 7:
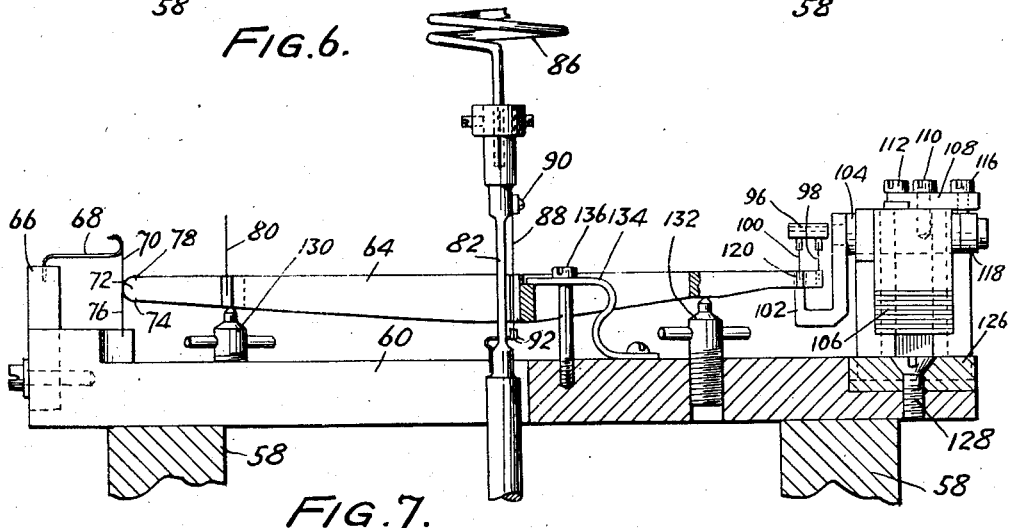
Figure 9:
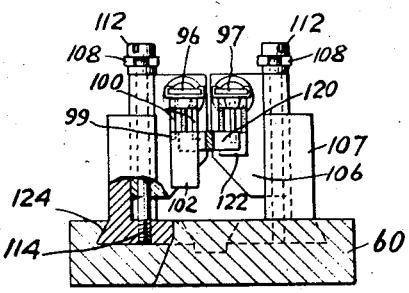
Figure 8:
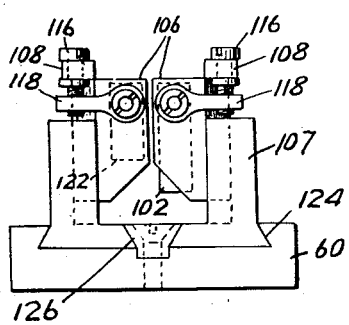
Figure 10:
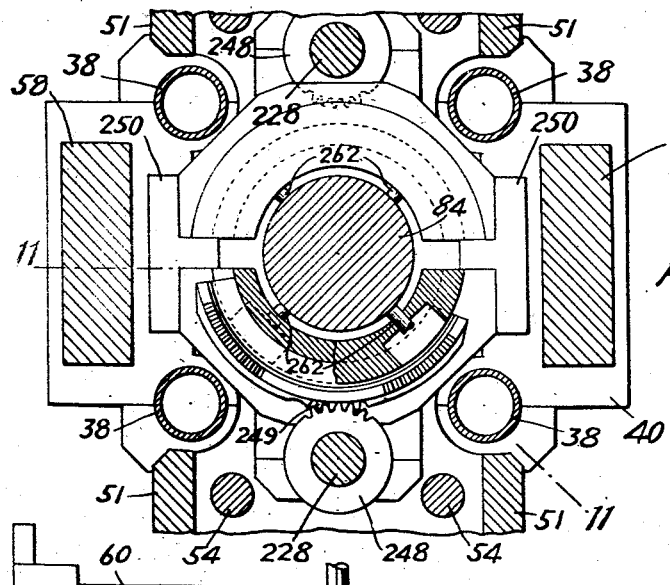
Figures 11, 12:
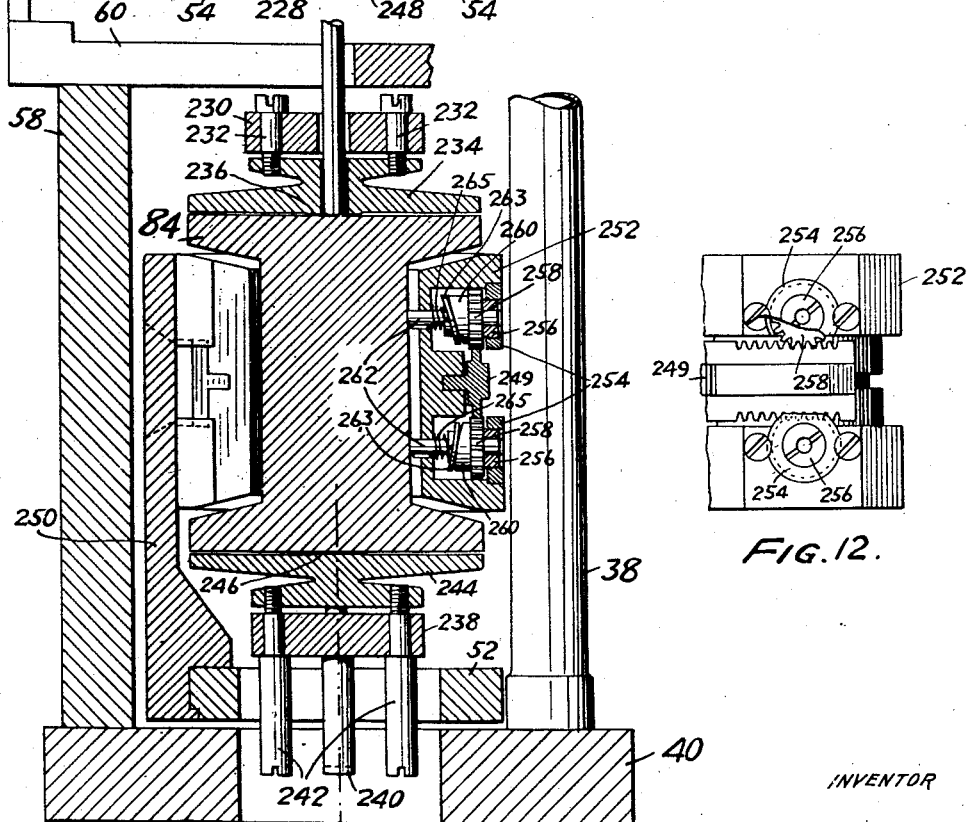

Figs. 3, 4 and 5 are horizontal sections taken on the planes indicated respectively by the lines 3—3, 4—4, and 5—5 of Fig. 2;

Fig. 6 is a plan view of the weighing beam and associated parts;

Fig. 7 is a vertical section of the same taken approximately longitudinally of the beam;

Fig. 8 is an end elevation showing certain adjusting means for the optical system;

Fig. 9 is a vertical section taken transversely of the beam;

Fig. 10 is a horizontal section showing certain locking means for the moving parts;

Fig. 11 is a vertical section showing the same subject;

Fig. 12 is a fragmentary view showing certain details of the locking means;

Figs. 13, 14 and 15 are fragmentary views showing details of the weighing spring adjusting means;

Fig. 16 is a horizontal section showing primarily details of the thermostatic control and indicating devices;

Fig. 17 is a vertical section showing the levels and means whereby they may be observed; and Fig. 18 is a plan view of such means.

The instrument comprises an outer casing 2, which may be of any suitable material, which may be supported upon tripods with suitable adjustment for very accurate leveling. The supporting means is not illustrated herein, since it may take a conventional form of the type used in supporting other extremely sensitive instruments such as, for example, torsion balances. Desirably the leveling apparatus should be of a type capable of adjusting the level of the instrument within a small fraction of a minute, and in the case of the apparatus herein disclosed it is undesirable to have deviations of more than five seconds. This extremely accurate leveling is necessary to prevent strains upon the delicate supporting devices which might affect the results. Besides, deviations from verticality will produce errors in determining the gravitational force exerted upon the moving parts.

Because of the extreme sensitivity of the instrument, insurance must be provided that the temperature of the parts be held constant to within one-thousandth of a degree centigrade. To secure this result, the interior of the outer casing is lined with a heat insulating material which may take the form of wood or other fibrous material within which there is located a housing indicated at 6 provided with a top shown at 8. This housing is a comparatively thick aluminum cylinder which acts as a heat reservoir preventing any rapid fluctuations in temperature within the permissible limits. There is provided in the casing 6 a reservoir 10 arranged to contain mercury for the thermostatic control. This control will be understood by reference to Fig. 16 in conjunction with Fig. 1, wherein it will be seen that there is provided in the housing wall a small bore 12 extending upwardly from the reservoir 10 and communicating through a suitable coupling with the capillary opening in a thermometer tube 14.

The top of this tube is formed with a well 16 designed to receive mercury overflow and facilitate initial adjustment. The rising mercury is adapted to form an electrical contact with a rod 18 carried by a screw 19 threaded in the cap of the protecting tube about the tube 14 and extending into the upper portion of the capillary opening. A suitably supported brush 20 bears against the head of the screw 19 and is connected by a wire 22 with one end of the coil of a relay 24 whose other end is adapted to be connected to one terminal of a battery, the other terminal of which is connected to the mercury. The relay armature indicated at 26 controls the flow of current through a winding 28 surrounding the housing 6. The circuit is conveniently completed by the use of a spring arrangement indicated at 30 connected to the cover 210 of the outer housing which must be removed for the making of major adjustments. Inside the housing 6 there is located an inner casing 34 of aluminum provided with interior ledges on which rests the cap 36 which forms the support for all of the sensitive operating parts of the instrument. Inasmuch as the casing 34 must be hermetically sealed to prevent buoyancy variations due to changes in atmospheric pressure, the plate 36 is held down by the means shown specifically in Fig. 16, including a rubber tubular gasket pressed into the joint by an annular wedge 35 forced downwardly by a ring 37 which is wedged and locked downwardly by a bayonet joint arrangement indicated at 39. Insulation 32 is provided in the space between the casing 34 and the housing 6. Although not shown in Fig. 1, insulation is also provided between the plate 36 and the cap 8 of the housing, this insulation being, for example, balsa wood with vertical sight openings for apparatus later referred to. The working apparatus included within the casing 34 may be said to contain two groups of elements, namely, those associated directly with the balance and partaking in the measurement of the changes of gravitational force and those elements which are used to clamp the parts and control them during movements of the apparatus. These two sets of apparatus are in a general way kept separate so that interaction is avoided as much as possible, the plate 36 forming a common starting point for the two sets of supports. However, as will be later brought out, the two sets may be connected adjacent the plate 36. The interaction which must be avoided is primarily that which might be due to stresses or twisting of the parts resulting from slight temperature variations. In spite of the accuracy of temperature control, the variations due to changes outside the limit indicated would be sufficient to disturb the accuracy of the readings.

In order to simplify the later discussion of the apparatus, there will be briefly referred to certain of the supporting elements and their relationships to each other.

There is secured to the central portion of the plate 36 by means of a threaded arrangement indicated in Fig. 2 a plate 138 which supports four vertically extending tubes 38, these tubes being preferably clamped to the plate 138 so as to avoid any torsional strains which might result if threaded connections were adopted. This clamping arrangement is not illustrated at the location just mentioned but is shown elsewhere for the securing of tubular supporting members, for example in Fig. 10, in connection with the securing of the lower portions of the tubes 38 to the supporting plate 40, whose position is indicated most clearly in Figs. 2 and 11. This supporting plate serves to hold the balance proper and the parts immediately associated therewith.

Downward extensions 42 of the plate 36 carry tubes 44 to which there is secured a plate 46, while lower extensions 48 of these tubes support a bracket 50 connected by means of vertical members 51 to a plate 52 which supports the clamping means for the weight connected to the beam of the instrument. Pillars 54 are carried by the plate 52 and in turn carry at their upper ends brackets 56 which serve as upper bearings for a plurality of rotary members controlling the clamping means.

Upright supports 58 carried by the plate 40 support the base 60 on which is mounted the beam. This base and the beam which it carries, together with the associated parts, is removable as a unit, being secured to the supports 58 by screws 62. The base 60 and the beam are bifurcated so as to be easily removable by horizontal sliding without disturbance to the spring and weight.

The beam, which is of light material (e. g. magnesium or aluminum alloy) and light construction, is indicated at 64. The beam in a typical instrument weighs only 1.3 gms. In view of the fact that the fulcrum for the beam imposes one of the major limitations upon the sensitivity of the apparatus if it exerts any appreciable restraint upon its movements, there has been devised the extremely sensitive fulcrum arrangement indicated primarily in Figs. 6 and 7, which though rugged and capable of withstanding the vibrations imposed when the instrument is transported, nevertheless imposes a minimum of restraint upon such minute angular movements of the beam as must be free to occur in obtaining readings. In fact, no measurable restraint was found in an instrument as described herein. The beam at the end where the fulcrum is provided is bifurcated and accordingly duplicate supporting arrangements are provided. Each of these includes a strong spring 68 carried by a vertically adjustable supporting piece 66 secured to the base 60, which spring at its free end carries a very fine ribbon indicated at 70 which is deflected about the convex end of the beam shown at 72 and is secured to the beam at 74.

A second ribbon indicated at 76 is secured at its lower end to the base 60 and passes upwardly about the convex end 72 of the beam and is secured thereto at 78.

By reason of the pairs of ribbons just described, there is provided an extremely sensitive but balanced and rugged support for the end of the beam. The radius of curvature at 72 is made so great that the stresses in the ribbons are maintained far below the elastic limit. The ribbons normally have a tendency to assume a straight position so that in view of their opposite curvature their efforts to impart angular rotation to the beam are neutralized to the extent that they do not tend to turn the beam at all. The movements of the beam are extremely slight, and since during an angular movement the radius of curvature at the point of tangency to the end of the beam of any of the ribbons is unchanged, there is no rotational force exerted on the beam at any time by the suspension. It has been found that ribbons of molybdenum having a width of .010″ and a thickness of .0004″ are highly satisfactory. With such ribbons a radius curvature of one-sixteenth inch at 72 is used. The duplication of the supporting means insures that the beam will be stable against rocking about any longitudinal axis and furthermore there will be no damage done by vibration when the beam is held in clamped position as might occur if, for example, a knife edge support were used.

The beam is connected to the weighing spring by means of a ribbon bridge indicated at 80, the weighing spring which will be referred to hereafter being connected centrally to this bridge.

There extends vertically between the bifurcations of the beam 64 a rod 82 which, at its lower end, carries the weight 84 and at its upper end is secured to the main spring 86. Connected to the rod 82 at 90 there is a metallic ribbon 88, for example of molybdenum similar in dimensions to the ribbons 70 and 76, whose lower end is fixed in a stiff spring 92 carried by the rod so as to maintain the ribbon 88 taut. The ribbon is secured in a slit 94 in the beam, thereby forming the connection between the beam and the spring and weight. This arrangement, it will be noted, provides a connection which is not subject to being readily damaged by vibration of the light beam when the weight and spring are clamped. The location of the center of gravity of the beam is not particularly important, but it is preferably near 94.

A German-silver weight 84 weighing between 100 and 300 gms. has been found most satisfactory. This weight as well as all of the other moving parts must be non-magnetic to avoid effects due to terrestrial magnetism.

At the right-hand end of the beam as viewed in Figs. 6 and 7 there are located mirrors 96 and 97 which form a part of the optical indicating system. The connections of the mirrors are somewhat similar and there will be first discussed in detail the elements forming the mounting for the mirror 96. The mirror is connected by a metallic ribbon 98 similar to those mentioned above with the turned end 99 of the beam. It is also connected by a pair of similar ribbons 100 located to the left of the ribbon 98 as viewed in Fig. 7 to an arm 102 carried by a horizontally extending pin 104 having a bearing in a block 106, the bearing arrangement being preferably of the double conical type illustrated, so that a very fine definite positioning of the arm 102 may be insured. The block 106 is mounted for vertical sliding movements in a horizontally adjustable block 107. There is secured to the top of the block 106 by means of a screw 110 a plate 108 having a bifurcated end forming a vertical restraint upon a screw 112 into a groove in which the bifurcations extend. This screw 112 is threaded at its lower end 114 into the block 107. By turning the screw, fine vertical adjustment of block 106 and consequently of the arm 102 and ribbon 100 is obtained. There is similarly journalled in the plate 108 a screw 116 which is threaded into an arm 118 carried by the pin 104. The turning of this screw serves to provide a fine adjustment of the angular position of the arm 102 and hence of the angular position of the mirror 96 about an axis extending longitudinally of the beam. It will be noted that the pair of ribbons 100 contribute in securing a stable adjustment. As will be pointed out hereafter, this adjustment serves to insure a proper meeting of images of a straight lamp filament in the field of a telescope. The ribbons are conveniently fastened by drops of lacquer.

The mounting of the mirror 97 is similar but reversed. That is, the left-hand ribbon as viewed in Fig. 6 is secured to an arm 120 of the beam while the right-hand pair of ribbons are secured to an arm 122 carried by a pin 123 similar to pin 104 and provided with identical adjustments. It will be seen that these adjustments of the two mirrors serve to universally vary their positions relatively to each other. The blocks 107 are mounted in guideways 124 in the base 60. They may be clamped in adjusted position by the screw 128 acting through the wedge-shaped member 126. The spacing of the ribbons 98 and 100 measured longitudinally of the beam is 2 mm. This insures proper stability.

In spite of the relative ruggedness of the beam supporting means and the provision of a means for clamping the weight and main and weighing springs, it is of importance particularly during initial adjustments to clamp the beam in fixed position by auxiliary means, this being particularly desirable during initial fixation of the mirrors. For this purpose there are threaded into the base 60 vertically adjustable screws 130 and 132 upon which the beam may be clamped downwardly by means of a spring 134 tensioned against the upper portion of the beam by a screw 136. A rigid setting of the beam in its desired initial position is thus attained during the period when connections are being made. When the setting is completed, these various adjusting means are withdrawn, the clamping devices for the springs and weight being sufficient to hold the beam during, for example, transportation from one position to another in making field observations.

Reference has already been made to the support of the beam through the medium of tubes 38 extending downwardly from the plate 138. Support must be provided for the upper end of the spring 86 from the same plate 138, the suspension being such that the spring will not be elongated by temperature changes when the parts are clamped. This is particularly necessary to avoid hysteresis effects when the apparatus is not being used for a considerable period and when, consequently, it is not practical to maintain the temperature as constant as above indicated. The compensating arrangement will be best understood from a consideration of Fig. 1. In a general way, it takes the form of the common compensating arrangement used for pendulums. Vertically extending rods 140 supported by the plate 138 carry a plate 142 in which there are secured upwardly extending tubes 144 housing rods 148 secured to the tubes at their upper ends 146. The lower ends of the rods 148 extending beyond the bottoms of the tubes 144 carry a plate 150 in which is secured an upwardly extending tube 152, the upper end of which carries a bracket 154. Threaded in this bracket is a rotatable rod 156 which is threaded at its lower end into a block 158 mounted for sliding movement in the lower end of the tube 152 and held from turning by suitable means such as indicated at 159 comprising, for example, a plate carried by the block 158 perforated to receive a fixed downwardly extending pin. At 160 the spring 86 is connected to the block.

As usual in temperature compensating devices, materials having various coefficients of expansion are used for the formation of the various upright members. In the present instance these are so chosen that the net change of position of the lower end of the spring 86 with respect to the beam support due to temperature variations is zero, having regard to all of the parts of the instrument whose changes in length contribute towards changing the spring length.

In order to secure a fine adjustment, the threads at the top and bottom of the rod 156 advance in the same direction but with a slightly different pitch. Accordingly, upon each rotation of the rod, the block 158 will be advanced to an extent equal to the difference in pitch of the two threads. Inasmuch as this difference in pitch may be made very small even though the pitch of each thread is sufficiently large to provide a thread of suitable thickness, a very fine adjustment of the position of the upper end of the spring 86 is provided. The spring 86 is preferably formed of material such as a tungsten alloy (e. g. a tantalum-tungsten alloy) having a very low temperature coefficient of elasticity so that the effects of temperature changes are minimized as much as possible. When an ordinary spring undergoes a change in temperature, the elongation not only produces a change in the material length, but also a twisting of one end relative to the other. In the present apparatus even the slightest twisting would be objectionable. This may be entirely eliminated, however, by forming the spring in two sections of opposite twist, as indicated in the figure. In such case a temperature change may cause a slight rotational displacement of the connection between the two sections, but the net effect on the ends is nil. The spring may be wound from a single piece as indicated in the figures. Instead of winding a spring in this fashion, however, there may be provided two separate oppositely wound springs with their adjacent ends connected by a coupling member.

There is connected to the beam 64 through the bridge member 80 previously referred to a weighing spring 162 of very fine wire and very light construction so that the change of stress corresponding to a unit elongation is quite small. The spring 162 is secured at its upper end to a suspending rod 164, connected through the medium of a fine ribbon 166 to one end of a lever 168. The lever 168 is hinged to a bracket 182 carried by one of the posts 44 by means of two thin ribbons 180. At its free end opposite its connection with the rod 164 the lever 168 is connected to a member 184 by means of a flat, thin metallic spring plate 186 which is fitted into slits in the lever 168 and the member 184 as indicated in Figs. 13 and 14. At the top of the member 184 there is affixed an agate bearing 188. In order to provide a suitable guide for the member 184, it is engaged at its upper end by the end of a guide spring 190 fixed to a bracket 192 carried by the bracket 182 previously referred to, the arrangement being such that the member 184 will retain a substantially vertical position during the limited movements imparted to it.

The various connections referred to, namely, 166, 180, 186 and 190 are preferably formed of phosphor bronze having a thickness of the order of .005 inch. Material of this size provides connection for the various members of such type that, although a rugged construction is attained, no objectionable restraint is imparted. For the present purpose, these small spring members provide fulcra which cannot get out of adjustment during transportation of the apparatus.

Engaging the agate bearing 188 there is the lower end of shaft 198 which is threaded into a nut 196 carried by the support 42. The shaft 198 passes upwardly through a mercury seal 195, similar to one indicated at 218, hereafter described, which seal 195 serves to cut off communication between the upper and lower sides of the plate 36. The shaft 198 is arranged to be manually driven through suitable reduction gearing indicated at 199 and 201 by manual manipulation of a knob 203 journalled in the plate 210 which closes the top of the outer housing 2. To the shaft 198 there is secured an indicating dial 205 moving adjacent to an index marker and serving to indicate by the markings thereon either the elongation of the spring 162, or directly the effort exerted by this spring upon the beam 64, which effort is, of course, directly proportional to the elongation. In the apparatus in its preferred form this dial is graduated to indicate directly the variations in gravitational pull in millidynes per gram. For this purpose the dial is provided with 500 divisions, each indicating one-fifth of a millidyne. One complete turn of the dial corresponds to 0.5 mm. elongation of the spring 162. Readings are possible to about 0.1 millidyne, the total range without resetting of the main spring 86 being about 300 millidynes corresponding to three revolutions of the dial or elongation of spring 162 by 1.5 mm.

Figure 1:
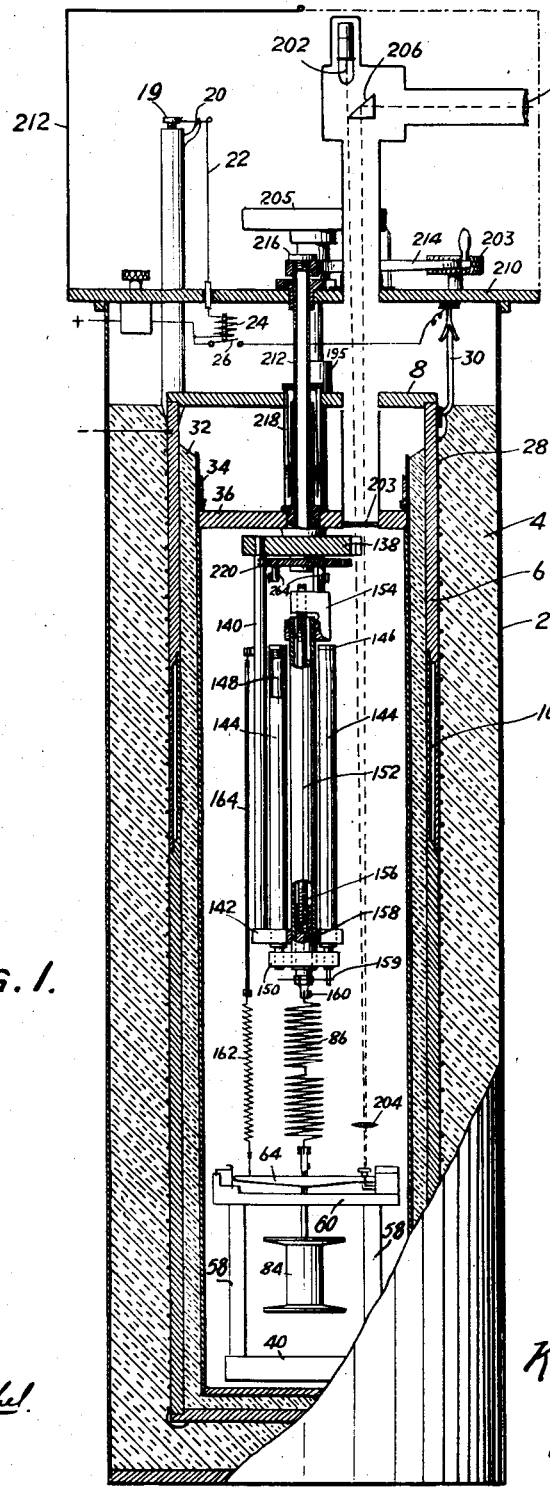
Fig. 1 is a vertical section through the apparatus showing the general assembly of the parts, details being omitted for clarity.

Indication of the position of the beam 64 is obtained through an optical system which is illustrated diagrammatically in Fig. 1. This optical system may take various forms, but preferably comprises a lamp 202 having a filament the vertical projection of which is straight, which may be viewed by reflection from the mirrors 96 and 97 by means of a telescope. The optical system may comprise, for example, the lamp 202 just referred to, a plane plate of glass 203 which is provided merely to form an airtight transparent closure for the inner chamber, a lens or system of lenses 204 for rendering parallel the rays impinging on the mirrors, a reflecting prism 206, and an eyepiece 208 by which the real image formed adjacent the eyepiece is viewed. The type of indication obtained will be pointed out in greater detail hereafter. For clarity at this point, it may be stated that the zero position of the beam is desirably indicated by the linear coincidence of the images of filament 202 viewed by reflection by the two mirrors 96 and 97. The magnification of the optical system, it will be noted, serves to amplify the variations of the beam from its zero position, there occurring a doubling by reason of the opposite tilting of the two mirrors and further amplification by reason of the length of the optical system and the magnification in the telescope.

Journalled in the plate 36 through the medium of a suitable bushing arrangement which forms in part the means for holding the plate 138 in position, there is a hollow shaft 212 connected to a lever 214 located above the plate 210 and normally closed by means of a screw plug 216. The tubular form of the shaft 212 is provided in order that upon removal of the plug or cap 216 an instrument such as a long screw-driver may be inserted to engage the upper end of the threaded rod 156 and turn it to adjust the suspension of the spring 86. Normally the tube 214 is capped so as to prevent the inward or outward flow of air from the interior chamber. To permit the tube to partake of rotary movements, there is provided a mercury seal 218 of conventional type including an annular cup containing mercury into which there dips an annular flange carried by the shaft 212.

The shaft 212, at its lower end, carries a gear 220 which meshes with pinions 222 carried by vertical shafts 224 journalled within the tubes 44. These shafts, at their lower ends, are coupled to upright rods 228, journalled at their upper ends in an accurate fashion by the provision of double conical bearings in the plate 56, and at their lower ends in bearing openings in the plate 52. An upper nut member 230 has threaded engagement with upper threads on the rods 228 and serves to support, through the medium of screws 232, an upper damping plate 234 having an opening therein through which may extend the stem 82 of the weight 84. The screws 232 are threaded into the damping plate 234 and are freely rotatable within the nut member 230, being limited in their downward movement by their heads. In order to lock the damping plate 234 in fixed position, there are arranged to bear against its upper surface screws 233 tapped into the nut member 230.

The damping plate is arranged to have a very slight clearance with the weight 84 when the apparatus is in use. The air in the slight clearance space provides a damping action to insure against vibration of the weight. If the damping plates have quite extensive contact with the weight 84 when locking takes place the slight vibration in transit might result in substantially complete elimination of the air with the result that there would be a sticking when the locking devices were released, possibly resulting in violent oscillation of the weight. To avoid this, there is provided a slight projection 36 formed from the central portion of the lower face of the plate 234 so that only at this locality may actual contact take place. A satisfactory action is thus attained. The amount of damping action may be controlled by adjustment of lever 214. The clearance to effect substantial damping is of the order of a few thousandths of an inch.

A lower nut member 238, similar to the upper one 230, is likewise threaded upon the rotatable rods 228, the threads engaging with this nut member having a pitch opposite that of the upper threads. The nut member 238 supports, through the medium of screws 240 and 242 corresponding to 233 and 232, a lower damping plate 244 which is also provided with a projection from its damping face as indicated at 246. As will be hereafter more fully pointed out, the plates 234 and 244 not only serve to damp the vibrations of the weight 84, but also serve to clamp it in fixed position during transportation of the instrument.

The central portion of each of the rods 228 carries a pinion 248 meshing with gear segments 249 as indicated in Figs. 10 and 12. These gear segments are guided in oppositely positioned, semi-cylindrical blocks 252 supported by posts 250 from the plate 52. In these blocks there are fixed nuts 254 in which are threaded bearing members 256 adapted to be adjusted inwardly and outwardly by, for example, the use of a screw-driver. Extending into the journal members 256 so as to be axially slidable therein are pins 262 extending inwardly through openings in the blocks 252 so as to engage, by radial movements, the cylindrical upright central portion of the weight 84. The pins 262 have splined connection with the blocks 252 so as not to rotate therein, and carry obliquely extending plates 263 engageable by cams 260 carried by pinions 258 journalled upon the pins 262 and meshing with racks upon the gear segments 249. Springs 265 normally urge the pins outwardly so as to disengage them from the weight. The arrangement is such that as the rods 228 are rotated, the pins 262 are forced inwardly to simultaneously engage the weight 84 at the same time that the damping plates 234 and 244 are moved downwardly and upwardly respectively to engage its top and bottom. The weight may thus be clamped against movement in any direction. The adjustments which have been mentioned are such that a simultaneous engagement by all of the parts may be effected, preventing any vibration due to impact.

The gear 220 carries downwardly projecting pins 264 shown in Figs. 2 and 3, which are arranged to engage arms 266 carried by upright shafts 268 journalled in the plates 42 and 46. Levers 270 at the lower ends of the shafts 268 are arranged to bear upon and press inwardly upright levers 272 pivoted at 273 as indicated in Fig. 2. At their lower ends these rods carry frames 274 on which are adjustably carried upright rods 276 with radially directed inner faces covered with leather or other suitable soft material for engagement with the spring 86. The levers 272 are normally urged outwardly by springs 275. The frames 274 also carry upright members 278 provided with faces adapted to partially embrace and hold in fixed position the weighing spring 162. All of the various clamping parts are so adjusted that simultaneous clamping of the two springs and the weight 84 take place upon movement of the arm 214 connected to the shaft 212.

Levels 280 and 282 are mounted on plate 36 and are viewed through suitable glass covered openings in plates 8 and 210 and the insulation between these plates with the aid of a mirror 284, suitable provision for illumination being made. These levels are of a type cable of being read within the limits mentioned above to aid in setting the instrument to the required high degree of accuracy. Additional levels (not shown) may be provided on the plate 210 to serve during initial adjustments.

The instrument just described is capable of measuring small differences in the force of gravity with a precision of the order of one ten-thousandth of a dyne per gram, which is about one-ten-millionth of the total force of gravity amounting, in round figures, approximately to one thousand dynes per gram. A conception of the variation of the force of gravity of the magnitude just mentioned may be gained by considering that a change of one ten-thousandth of a dyne per gram amounts to the change in the force of gravity due to a change in elevation of about one foot. In other words, one division of the scale 205 indicates a change corresponding to an elevation of two feet.

The zero position to which the parts are brought for the making of a reading is determined in the present instrument by coincidence of the two images of the lamp filament as viewed through the eyepiece 208. It may be pointed out that this arrangement avoids the necessity for maintaining a fixed point of reference in the telescope; for when the two mirrors are in the same plane, coincidence of the images is obtained no matter how much the eyepiece and other optical parts are displaced. The initial adjustment of the instrument is accordingly primarily concerned with securing this coincidence of images when the beam is in the desired zero or horizontal position. Accordingly, in the initial adjustment the beam is locked by the means indicated in Fig. 7 and the mirrors set to obtain coincidence of the images. The vertical adjustment to obtain coincidence is effected by movements of the slides 106. Proper alignment to secure equal vertical extents of the two images where they meet may be obtained by tilting the mirrors by means of the adjusting screws 116. It has been found that accurate measurements may be made even while the beam is slightly oscillating by estimating equality of the oscillations about a zero position. The optical system in a preferred embodiment of the invention is so arranged that by reason of the optical lever provided by the tilting mirrors there is provided a movement of the image formed in front of the eyepiece 1200 times the corresponding movement of the end of the beam to which the mirrors are connected. The beam ratio is about 1.8; that is, this end of the beam has about 1.8 times the movement of the weight 84. In addition, an eyepiece is provided which magnifies the image of the filament fourteen times. As a result, a total magnification of the movement of the weight of about thirty thousand is provided.

Besides this initial adjustment of the optical system, adjustment is also made to insure simultaneous locking of the two springs and the weight 84 so that when locking and release take place during operation, vibration due to impact will be prevented. The effects of elastic hysteresis are eliminated by locking the weight and springs in zero position between observations, so that the tension on the spring is never varied by more than the difference between the values of the force of gravity between two successive stations. Any hysteresis effect is then only a small fraction of this amount. This requires that the weight be locked to within less than .001 mm. of the true zero position and that the spring may be locked to prevent vibration of the convolutions. It is in general unnecessary to repeat the adjustment of the locking means once it has been made. In connection with the making of these initial adjustments, it may be pointed out that the beam and its associated parts carried by the slide 60 may be removed horizontally, thereby facilitating operations.

The next step is the calibration of the apparatus. For purposes of calibration, the apparatus must, of course, be brought to those conditions which must exist during the making of readings. The initial design is made to approximate the desired conditions, the principal object in view being the proper distribution of load between the main spring 86 and the weighing spring 162. In this instrument, when the parts are in zero position the spring 162 is adapted to support approximately one-thousandth of the load imposed by the weight 84. The spring 162, however, cannot be readily designed so that, for example, a change in length of 1.5 mm. corresponds exactly to a change of 300 millidynes per gram. Calibration is accordingly necessary. In view of the fact that, as pointed out above, the change in gravitational force per unit change in elevation is accurately known, the calibration may be readily effected merely by making readings at one elevation and then changing the elevation by a known amount and making another reading, correction being made for the change in the position of the moon at the two times of observation. Such calibrating readings are carried out in the manner described below adopted for the making of readings in general.

The obtaining of temperature equilibrium in the instrument is the primary time-consuming limitation in the matter of making rapid observations. It is entirely out of the question to make a temperature correction rather than maintain the temperature constant. Time is required for the attainment of temperature equilibrium and any attempt to maintain the temperature only approximately constant outside the range which makes temperature effects negligible with respect to the accuracy desired would result in the parts of the instrument being at non-permissible different temperatures. After a long stand-by period through which it may be impractical to maintain current flowing through the heating coil, it is necessary to set the thermostat and then permit the apparatus to heat up for such a period that no drift due to temperature changes can be observed. This heating period following the period of inactivity may consume as much as twenty-four hours. To avoid such delay if the instrument is only to remain unused for short periods of several days, it is generally advisable to maintain the heating current flowing continuously. For field work it is generally desirable to have the temperature of the instrument several degrees above the highest expected outside temperature. By the maintenance of the heating current during periods of transportation, successive observations may be made at various points without delay and with considerable rapidity.

When the equilibrium temperature is at least approximately attained, it is necessary to set the instrument so as not to read off scale or require excessive displacement of the spring 162 from equilibrium position. This setting is attained by changing the length of the spring 86 by rotating the screw 156 by an instrument passed down through the tube 212. After adjustment is effected, the tube 212 is capped so that thereafter external changes in atmospheric pressure will not affect the instrument by changing the buoyant force upon the moving parts. The necessity for initial settings in a given region will be apparent by considering the fact that the force of gravity changes with altitude, as above mentioned, and also with latitude by reason of the variations of centrifugal force with change in distance from the axis of the earth's rotation. The latitude changes as well as the variations occasioned by lunar changes are minor and primarily the setting must be made because of altitude changes and different equilibrium temperatures which might be found desirable because of external temperature conditions.

Each observation which is made comprises a plurality of readings which may, for example, be five in number. The readings are simply made. It is only necessary, after the preliminary adjustments are made, for the observer to release the locking mechanism, providing by the position of the arm 214 the desired amount of damping and then after vibrations have been sufficiently damped out, turn the dial knob 203 until coincidence of the filament images is attained. Successive readings may be made by moving the dial to destroy the equilibrium condition and then bringing the system back to zero position. The adjustment of damping takes care of the elimination of rapid vibrations due to traffic, wind or the like. The effects of the wind are most disturbing to the making or readings inasmuch as the swaying of trees causes substantial disturbance of the earth's surface. At the time each reading is made, there must be noted the altitude of the instrument, by surveying if accuracy is desired, and its position as well as the time the observation is made. If extremely accurate observations are not necessary, then a barometer may be used to give an indication of the altitude, correction being later made for the variations of barometric pressure at sea level. A survey of the locality must be taken into account in connection with accurate observations not only to get the exact altitude but because of the variation of gravitational force with latitude due to the centrifugal effect of the rotation of the earth. The time must be noted so that correction may later be made for the position of the moon. If the instrument is used in a locality where there is a substantial tide, correction may also be made to take account of the variation in gravitational pull due to the proximity of a variable large amount of water. It may be noted that the instrument is very carefully leveled for each observation and consequently the local vertical component of the gravitational force is measured.

After readings at one station are made, the parts are locked in zero position without change of the main spring support or change of pressure in the instrument. Then while maintaining the temperature constant, the instrument is transported to a new station, the locking apparatus released and other readings taken. After suitable corrections are made, the differences in gravitational forces reduced to the same level may be determined.

The instrument is primarily designed for the purposes of geophysical exploration. It is well known that large mineral deposits produce substantial local changes in the force of gravity. By carrying out systematic observations over a large area, it is possible to locate large mineral deposits whose density may be greater or less than that of the average over the whole area. The variations are, in general, due to the upward projection of large masses of heavy mineral deposits and it has been found that by plotting the variations of gravitational force over a given area a surface may be obtained which corresponds in a general way to the actual contours of the strata. This direct obtaining of a contour approximating the contour of the rock below the surface is a very useful result of the direct measurement of the gravity anomaly. A very good picture of the structure may be obtained with very few observations, whereas, if a torsion balance is used, measuring the gravity gradient, the plot of the gradient must be carefully interpreted and is of such form that unless many readings are made interpretation is difficult.

One of the primary uses of this instrument is for the location of salt domes which, as is well known, have generally associated with them oil deposits. The outline of a salt dome may be determined with considerable accuracy by gravitational observations. Observations of this type have heretofore been made by the use of torsion balances or pendulums. Readings of such instruments, however, are quite difficult and require long periods of time. At most, readings at about three stations per day can be made by the use of the torsion balance, while by the use of a pendulum even a greater amount of time is required to make an observation. By the use of the present instrument, three or more observations at different stations can be made in an hour and the results readily corrected to a given level and interpreted. It will be obvious, therefore, that a given area may be covered in far less time than by the use of the other well known instrument.

What I claim and desire to protect by Letters Patent is:

1. A measuring instrument of the character described comprising a mass, means indicative of the position of the mass, a spring for exerting a major vertical effort upon said mass, a second spring for exerting an additional minor vertical effort upon said mass to bring the mass to a determinable position, means whereby the effort exerted by the second spring may be determined, means for locking the mass and springs in a zero position, and supporting devices, said devices comprising separate supporting elements for the locking means and the mass and a common member, said supporting elements being joined only at the common member.

2. A measuring instrument of the character described comprising a mass, means indicative of the position of the mass, a spring for exerting a major vertical effort upon said mass, a second spring for exerting an additional minor vertical effort upon said mass to bring the mass to a determinable position, means whereby the effort exerted by the second spring may be determined, and means for elongating the first mentioned spring comprising a member connected to the first spring, and a differential screw threaded into a fixed support and also into said member.

3. A measuring instrument of the character described comprising a mass, means indicative of the position of the mass, a spring for exerting a major vertical effort upon said mass, a second spring for exerting an additional minor vertical effort upon said mass to bring the mass to a determinable position, and means for varying the tension of the second spring comprising a lever connected thereto, a spring member connected to the lever, and adjustable means bearing upon the spring member for varying the position of the lever.

4. A measuring instrument of the character described comprising a mass, means indicative of the position of the mass, a spring for exerting a major vertical effort upon said mass, a second spring for exerting an additional minor vertical effort upon said mass to bring the mass to a determinable position, and means for varying the tension of the second spring comprising a lever connected thereto and adjustable means for varying the position of the lever, said lever being supported by a resilient metallic ribbon.

5. A measuring instrument of the character described comprising a mass, means indicative of the position of the mass, a spring for exerting a major vertical effort upon said mass, a second spring for exerting an additional minor vertical effort upon said mass to bring the mass to a determinable position, means whereby the effort exerted by the second spring may be determined, a hermetically sealed enclosure for said mass and springs, and an operating device extending through a liquid seal whereby adjustments of the aforementioned devices in the enclosure may be effected from the outside without distributing such sealed condition.

6. A measuring instrument of the character described comprising a mass, means indicative of the position of the mass, a spring for exerting a major vertical effort upon said mass, a second spring for exerting an additional minor vertical effort upon said mass to bring the mass to a determinable position, means whereby the effort exerted by the second spring may be determined, a hermetically sealed enclosure for said mass and springs including a mercury seal, and means whereby adjustments of the aforementioned devices in the enclosure may be effected from the outside without disturbing such sealed condition, said last named means comprising at least one shaft passing through the mercury seal.

7. A measuring instrument of the character described comprising a mass, means indicative of the position of the mass, a spring for exerting a major vertical effort upon said mass, a second spring for exerting an additional minor vertical effort upon said mass to bring the mass to a determinable position, means whereby the effort exerted by the second spring may be determined, and means for clamping the mass in its zero position, said means engaging the mass simultaneously at several points to avoid motion by reason of impact.

8. A measuring instrument of the character described comprising a mass, means indicative of the position, of the mass, a spring for exerting a major vertical effort upon said mass, a second spring for exerting an additional minor vertical effort upon said mass to bring the mass to a determinable position, means whereby the effort exerted by the second spring may be determined, means for clamping the mass in its zero position, and means for clamping the first mentioned spring simultaneously with the clamping of the mass.

9. A measuring instrument of the character described comprising a mass, means indicative of the position of the mass, a spring for exerting a major vertical effort upon said mass, a second spring for exerting an additional minor vertical effort upon said mass to bring the mass to a determinable position, means whereby the effort exerted by the second spring may be determined, means for clamping the mass in its zero position, and means for clamping both of said springs simultaneously with the clamping of the mass.

KENNETH HARTLEY.